(12) United States Patent
Chang et al.

(10) Patent No.: US 10,181,734 B2
(45) Date of Patent: Jan. 15, 2019

(54) CHARGING CONTROL METHOD AND CHARGING SYSTEM, POWER DELIVERY UNIT, AND POWER RECEIVER CONTROL CIRCUIT USING THE METHOD

(71) Applicant: RICHTEK TECHNOLOGY CORPORATION, Zhubei, HsinChu (TW)

(72) Inventors: Wei-Hsu Chang, New Taipei (TW); Ta-Yung Yang, Taoyuan (TW); Pei-Yu Chiang, New Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 47 days.

(21) Appl. No.: 15/287,961

(22) Filed: Oct. 7, 2016

(65) Prior Publication Data

US 2017/0310129 A1 Oct. 26, 2017

Related U.S. Application Data

(60) Provisional application No. 62/326,171, filed on Apr. 22, 2016.

(51) Int. Cl.
*H02J 7/00* (2006.01)

(52) U.S. Cl.
CPC ............ *H02J 7/0021* (2013.01); *H02J 7/007* (2013.01); *H02J 7/0045* (2013.01); *H02J 7/0052* (2013.01); *H02J 7/0072* (2013.01); *H02J 2007/0059* (2013.01); *H02J 2007/0062* (2013.01); *H02J 2007/0096* (2013.01)

(58) Field of Classification Search
CPC ...... H02J 7/0021; H02J 7/0045; H02J 7/0052; H02J 7/007
USPC ......................................................... 320/107
See application file for complete search history.

(56) References Cited

U.S. PATENT DOCUMENTS

| | | | | |
|---|---|---|---|---|
| 5,513,359 | A * | 4/1996 | Clark | G06F 1/30 345/212 |
| 7,564,453 | B2 * | 7/2009 | Van Dalfsen | G09G 5/00 345/204 |
| 8,013,570 | B2 * | 9/2011 | Baxter | B60L 3/0084 320/109 |
| 8,704,590 | B2 * | 4/2014 | Lai | H02M 3/156 323/284 |
| 9,048,732 | B2 * | 6/2015 | Lee | H02M 7/217 |
| 9,088,204 | B2 * | 7/2015 | Fang | H02M 1/08 |
| 9,753,077 | B2 * | 9/2017 | Shiu | G01R 31/045 |
| 9,966,764 | B2 * | 5/2018 | Buffenbarger | H02J 5/00 |

(Continued)

*Primary Examiner* — M Baye Diao
(74) *Attorney, Agent, or Firm* — Tung & Associates (57) ABSTRACT

The present invention provides a charging control method for controlling a power delivery unit to supply output power to a mobile unit, wherein the output power includes a DC output voltage and/or a DC output current. The method includes: receiving a power delivery configuration by the power delivery unit, wherein the power delivery configuration at least defines at least one execution time period and plural voltage(s) and/or current(s); the power delivery unit regulates the DC output voltage and/or DC output current according to the power delivery configuration during the at least one execution time period such that the DC output voltage and/or DC output current correspond to the power delivery configuration.

19 Claims, 3 Drawing Sheets

(56) References Cited

U.S. PATENT DOCUMENTS

| | | | |
|---|---|---|---|
| 2010/0164437 A1* | 7/2010 | McKinley | H01M 10/049 320/145 |
| 2012/0139482 A1 | 6/2012 | Zhang et al. | |
| 2012/0303983 A1* | 11/2012 | Kapoor | G06F 1/3206 713/310 |
| 2014/0239885 A1 | 8/2014 | Yang | |
| 2014/0372776 A1* | 12/2014 | Yang | G06F 1/26 713/300 |
| 2015/0372512 A1* | 12/2015 | Umemura | H02J 7/0021 320/112 |
| 2016/0226246 A1* | 8/2016 | Ellenberger | H05B 33/0842 |
| 2017/0310136 A1* | 10/2017 | Chang | H02J 7/0021 |

* cited by examiner

CHARGING CONTROL METHOD AND CHARGING SYSTEM, POWER DELIVERY UNIT, AND POWER RECEIVER CONTROL CIRCUIT USING THE METHOD

CROSS REFERENCE

The present invention claims priority to U.S. 62/326,171, filed on Apr. 22, 2016.

BACKGROUND OF THE INVENTION

Field of Invention

The present invention relates to a charging control method. Particularly it relates to a charging control method which can deliver a power delivery configuration containing multiple information in one data transmission to reduce communication loading. The present invention also relates to a charging system, a power delivery unit, and a power receiver control circuit using the method. The power delivery configuration at least defines at least one execution time period and plural voltage(s) and/or current(s).

Description of Related Art

Figure 1:
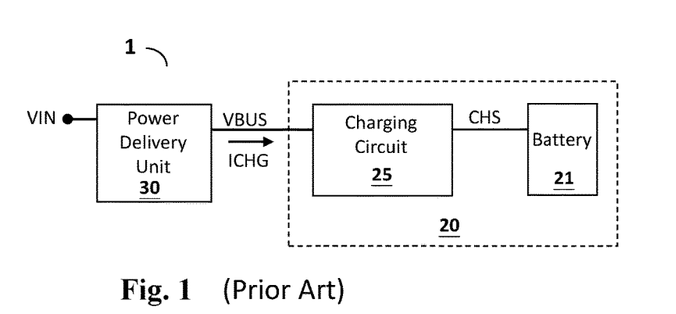
FIG. 1 shows a schematic diagram of a prior art charging system.

FIG. 1 shows a prior art charging system (charging system 1). The charging system 1 includes a mobile unit 20 (for example but not limited to a mobile device such as a smart phone, or a tablet computer, etc.), and a power delivery unit 30 (for example but not limited to a travel adaptor, or a power bank). The mobile unit 20 includes a battery 21 and a charging circuit 25. The power delivery unit 30 converts an input power VIN (for example but not limited to an AC power or a battery power in a power bank) into an output voltage VBUS (for example but not limited to VBUS which complies with USB PD). The charging circuit 25 converts the fixed voltage VBUS into a charging power CHS to charge the battery 21 with a constant voltage mode or a constant current mode. "USB PD" means Universal Serial Bus Power Delivery specification, the same hereinafter.

The prior art shown in FIG. 1 has a drawback that the charging time is relatively long because the current rating of VBUS is not high (for example usually 500 mA), and so is the charging current converted from the charging power CHS.

Figure 2:
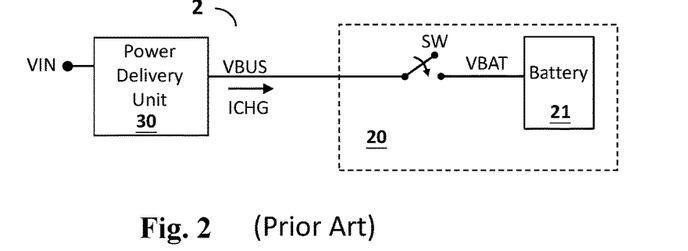
FIG. 2 shows a schematic diagram of a prior art charging system.

FIG. 2 shows a prior art charging system (charging system 2). The charging system 2 includes a mobile unit 20 (for example but not limited to a mobile device such as a smart phone, or a tablet computer, etc.), and a power delivery unit 30 (for example but not limited to a travel adaptor, or a power bank), wherein the mobile unit 20 includes a battery 21. The power delivery unit 30 converts an input power VIN (for example but not limited to an AC power or a battery power in a power bank) into a DC power VBUS (for example but not limited to VBUS which complies with USB PD). In this prior art, the power delivery unit 30 can directly charge the battery 21 in a direct charging mode, and the DC power VBUS can provide a relatively high charging current (for example but not limited to 5 A) thanks to the upgrade of the specifications, so the charging time can be tremendously shortened.

In general, during different charging phases, the charging voltage or current may change, for example but not limited to a soft start, or a soft stop, or complex mode switchings between a constant current mode and a constant voltage mode, etc. However, the power delivery unit 30 of the prior art shown in FIG. 2 can only be set to outputting a constant output voltage or a constant output current; hence, if the output voltage or output current needs to be dynamically changed, the mobile unit 20 needs to frequently transmits instructions to the power delivery unit 30, which will adversely affect the operation performance of the mobile unit 20.

Compared to the prior art shown in FIG. 1, the present invention is advantageous in that direct charging can tremendously shorten the charging time. Compared to the prior art shown in FIG. 2, the present invention has an advantage that the power delivery unit can, on its own without requiring frequent communication with the mobile device, change the charging voltage or current adaptively or in accordance with a pre-determined program, whereby the communication loading between the power delivery unit and the mobile unit can be reduced and the operation performance of the mobile device can be improved.

SUMMARY OF THE INVENTION

From one perspective, the present invention provides a charging control method, for controlling a power delivery unit to provide an output power for a mobile unit, wherein the output power includes a DC output voltage and/or a DC output current, the method comprises: receiving a power delivery configuration by the power delivery unit, wherein the power delivery configuration at least defines at least one execution period and plural voltages and/or currents; controlling the power delivery unit according to the power delivery configuration to regulate the DC output voltage and/or the DC output current during the at least one execution time period such that the DC output voltage and/or the DC output current correspond to the power delivery configuration.

In one embodiment, the power delivery configuration defines: (1) plural target output voltages, or plural target output currents, or a combination of a target output voltage and a target output current, or at least one target relationship of the output voltage relative to time, or at least one target relationship of the output current relative to time, or a combination of two or more of the above; and (2) the at least one execution time period.

In one embodiment, the at least one execution time period is an absolute time period or a conditional time period.

In one embodiment, the power delivery configuration further defines: at least one voltage limit, and/or at least one current limit, and/or at least one output limit time period.

In one embodiment, the charging control method further includes: transmitting the following information from the power delivery unit to the mobile unit: the power delivery configuration stored in the power delivery unit, and/or a power delivery present status of the power delivery unit, and/or a power delivery capability configuration of the power delivery unit; wherein the power delivery present status includes at least one present output voltage status, and/or at least one present output current status, and/or at least one present voltage-time changing rate, and/or at least one present current-time changing rate; and wherein the power delivery capability configuration includes at least one output voltage range, and/or at least one output current range, and/or at least one voltage-time changing rate range, and/or at least one current-time changing rate range.

In one embodiment, the mobile unit includes a battery, and the power delivery configuration is determined according to at least one electrical characteristic of the battery, and/or a pre-determined program, and/or the information which is transmitted from the power delivery unit to the mobile unit.

In one embodiment, the mobile unit includes a battery, and the power delivery configuration is determined according to at least one electrical characteristic of the battery, and/or a pre-determined program.

In one embodiment, the power delivery unit and the mobile unit do not communicate with each other during the at least one execution time period.

From another perspective, the present invention provides a power delivery unit which is controlled by the aforementioned charging control method.

From another perspective, the present invention provides a charging system, including: the power delivery unit which is controlled by the aforementioned charging control method; the mobile unit which receives the output power provided by the power delivery unit; and a cable, configured to operably connect the power delivery unit and the mobile unit.

In one embodiment, the cable complies with the USB PD (Universal Serial Bus Power Delivery) specification, and includes a power line and a signal line.

From another perspective, the present invention provides a power receiver control circuit, configured to operably control a power delivery unit to provide an output power for a battery of a mobile unit, wherein the output power includes a DC output voltage and/or a DC output current, the power receiver control circuit includes: a power delivery configuration determining circuit, configured to operably determine a power delivery configuration according to at least one electrical characteristic of the battery and/or a pre-determined program, wherein the power delivery configuration at least defines at least one execution period and plural voltages and/or currents; and a first communication interface, configured to operably communicate with a second communication interface of the power delivery unit to transmit the power delivery configuration to the power delivery unit.

In one embodiment, during the at least one execution time period, the power delivery unit and the power receiver control circuit do not communicate with each other and the power delivery unit generates the DC output power according to the power delivery configuration, whereby data transmission loading is reduced between the first communication interface and the second communication interface during the at least one execution time period.

In one embodiment, the power receiver control circuit further includes a switch control circuit which controls a switch connected between the power delivery unit and the battery according to at least one electrical characteristic of the battery and/or a command generated by the power delivery configuration determining circuit.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 3:
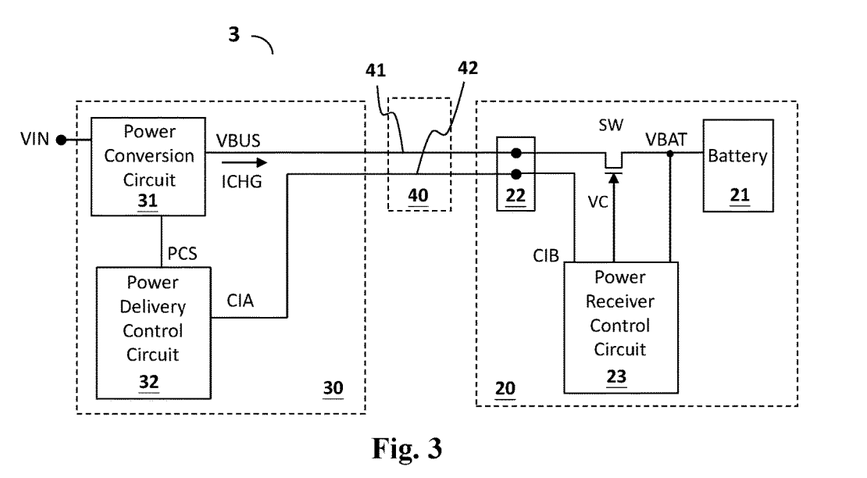
FIG. 3 shows a schematic diagram of an embodiment of the charging system according to the present invention.

FIG. 3 shows an embodiment of a charging system (charging system 3) according to the present invention. The charging system 3 includes a power delivery unit 30 (for example but not limited to a travel adaptor, or a power bank, or a device which can provide power, such as a monitor, a computer, a smart phone, or a tablet computer, etc.) and a mobile unit 20 (for example but not limited to a mobile device such as a smart phone, or a tablet computer, etc.).

The power delivery unit 30 includes a power conversion circuit 31 and a power delivery control circuit 32. The power conversion circuit 31 converts an input power VIN to a DC output power according to a power control signal PCS, wherein the DC output power includes a DC output voltage VBUS (for example but not limited to VBUS which complies with USB PD) and a DC output current ICHG. The DC output power is connected to a power line 41 (for example VBUS) of a cable 40 (for example but not limited to a USB PD cable). The power delivery control circuit 32 includes a communication interface CIA which is coupled to a signal line 42 (for example but not limited to a signal line complying with the Communication Channel signal specification of the USB PD specification) of the cable 40 to receive a power delivery configuration (will be described in detail later). The power delivery control circuit 32 generates the power control signal PCS according to the power delivery configuration, to regulate the DC output voltage and the DC output current such that the DC output voltage VBUS and the DC output current ICHG correspond to the power delivery configuration.

The mobile unit 20 includes a battery 21, a connector 22, a switch SW, and a power receiver control circuit 23. The connector 22 is configured to connect the cable 40. A first terminal of the switch SW is coupled to the battery 21, and a second terminal of the switch SW is coupled to the power line 41 via the connector 22. The switch SW is controlled by a switch control signal VC generated by the power receiver control circuit 23; the switch SW is turned ON in a direct charging mode whereby the DC output power directly charges the battery 21. The power receiver control circuit 23 generates the power delivery configuration according to an electrical characteristic (for example but not limited to a voltage VBAT or current of the battery, or a change rate thereof, or a combination of above), wherein the power receiver control circuit 23 includes a communication interface CIB to communicate with the communication interface CIA. The communication interfaces CIB and CIA may communicate with each other with for example but not limited to the Communication Channel Protocol of USB PD, wherein the communication interface CIB is connected to the signal line 42 via the connector 22 to transmit the power delivery configuration to the power delivery control circuit 32.

The aforementioned "power delivery configuration" defines an execution time period and a target during the execution time period. The target relates to plural voltage(s) and/or current(s) (i.e., at least two voltages, or at least two currents, or a combination of at least one voltage and at least one current). More specifically, the power delivery configuration includes for example but not limited to the following: (1) plural target output voltages, or plural target output currents, or a combination of a target output voltage and a target output current, or at least one target relationship of the output voltage relative to time (a target voltage-time changing rate obtained according to plural voltages at different time points), or at least one target relationship of the output current relative to time (a target current-time changing rate obtained according to plural currents at different time points), or a combination of two or more of the above; and (2) at least one execution time period; wherein the execution time period may be an absolute time period (for example starting from a reference time point, counting a given time period such as 5 minutes) or a conditional time period (for example starting from a reference time point until a given condition is met, such as the battery voltage achieving 4.0V).

In accordance with the power delivery configuration, the power delivery unit 30 generates the DC output power during the at least one execution time period such that the DC output voltage VBUS and/or the DC output current ICHG correspond to the power delivery configuration.

Note that since the power delivery configuration defines plural target voltages and/or currents, the power delivery control circuit 32 of the charging system of the present invention can by itself control the power conversion circuit 31 according to the power delivery configuration to generate the DC output power corresponding to the power delivery configuration, and does not need to communicate with the power receiver control circuit 23 during the at least one execution time period (i.e. the power delivery unit 30 and the mobile unit 20 do not need to communicate with each other during the at least one execution time period), which can reduce the data transmission loading, such as data amount, number of communication times, and frequency of communication between the communication interfaces CIA and CIB. In general, the power receiver control circuit 23 is coupled to a processing unit (not shown) of the mobile unit 20. The reduction of the communication loading of the communication interface CIB can also reduce the communication loading between the power receiver control circuit 23 and the processing unit, and hence the overall operation performance of the mobile unit 20 can be improved.

Figure 4:
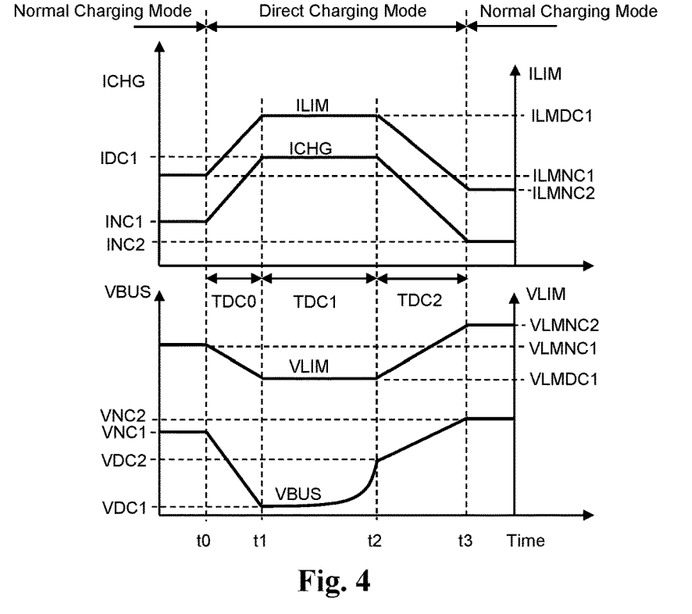
FIG. 4 shows waveforms of the charging system according to the present invention.

FIG. 4 shows waveforms corresponding to the charging system of the present invention. In this embodiment, the charging system (for example but not limited to the charging system 3 shown in FIG. 3) of the present invention includes mode switchings between a normal charging mode and a direct charging mode, wherein the direct charging mode means that the power delivery unit 30 directly charges the battery 21 of the mobile unit 20 (via the switch SW shown in FIG. 3) and the normal charging mode means that the power delivery unit 30 indirectly charges the battery 21 through other circuits (for example but not limited to a charging circuit provided in the mobile unit 20, not shown). In this embodiment, the direct charging mode for example may be a constant current mode (CC mode).

Referring to FIG. 4, waveforms VBUS and ICHG show the profiles of the DC output voltage VBUS and the DC output current ICHG. More specifically: before the time point t0, the charging system 3 is in the normal charging mode. The DC output voltage VBUS is at a pre-determined level VNC1; the switch SW is not conductive, and the battery 21 is charged by the charging circuit (not shown) of the mobile unit 20. The "pre-determined" level VNC1 may be a fixed value or an adjustable variable. And, before the time point t0, the level INC1 of the DC output current ICHG is determined by the charging circuit and the battery 21 of the mobile unit 20. During the time period between the time point t0 and the time point t3, the power receiver control circuit 23 controls the switch SW to be conductive according to for example but not limited to the voltage of the battery 21 such that the charging system 3 enters the direct charging mode.

During the time period TDC0 between the time point t0 and the time point t1, the level of the DC output voltage VBUS increases from the pre-determined level VNC1 to VDC1 (wherein VDC1 for example may be, substantially, the voltage level of the battery 21), and the level of the DC output current ICHG increases from INC1 to a pre-determined level IDC1.

During the time period TDC1 between the time point t1 and the time point t2, the level of the DC output current ICHG is regulated to the pre-determined level IDC1 (for example but not limited to a constant current level for charging the battery 21 with constant current mode), and the level of the DC output voltage VBUS is determined by the characteristic of the battery 21 and the current level IDC1 of the DC output current ICHG. The DC output voltage VBUS increases from VDC1 to VDC2 during the time period TDC1.

During the time period TDC2 between the time point t2 and the time point t3, the level of the DC output current ICHG increases from IDC1 to INC2, and the level of the DC output voltage VBUS increases from VDC2 to a pre-determined level VNC2.

After the time point t3, the charging system 3 is in the normal charging mode, wherein the DC output voltage VBUS is at a pre-determined level VNC2, and the level INC2 of the DC output current ICHG is determined by the charging circuit and the battery 21 of the mobile unit 20.

Figure 5:
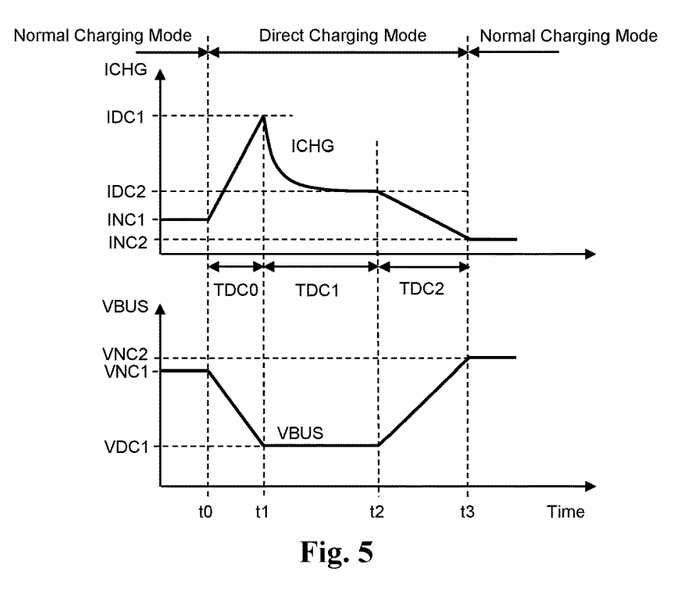
FIG. 5 shows waveforms of the charging system according to the present invention.

FIG. 5 shows waveforms corresponding to the charging system of the present invention. In this embodiment, the charging system (for example but not limited to the charging system 3 shown in FIG. 3) of the present invention includes mode switchings between a normal charging mode and a direct charging mode, wherein the direct charging mode of this embodiment for example is a constant voltage mode (CV mode).

Referring to FIG. 5, waveforms VBUS and ICHG show the profiles of the DC output voltage VBUS and the DC output current ICHG. More specifically: before the time point t0, the charging system 3 is in the normal charging mode. The DC output voltage VBUS is at a pre-determined level VNC1; the switch SW is not conductive, and the battery 21 is charged by the charging circuit (not shown) of the mobile unit 20. The "pre-determined" level VNC1 may be a fixed value or an adjustable variable. And, before the time point t0, the level INC1 of the DC output current ICHG is determined by the charging circuit and the battery 21 of the mobile unit 20.

During the time period between the time point t0 and the time point t3, the power receiver control circuit 23 controls the switch SW to be conductive according to for example but not limited to the voltage of the battery 21 such that the charging system 3 enters the direct charging mode.

During the time period TDC0 between the time point t0 and the time point t1, the level of the DC output voltage VBUS increases from the pre-determined level VNC1 to VDC1 (for example but not limited to a constant voltage level for charging the battery 21 with constant voltage mode), and the level of the DC output current ICHG increases from INC1 to IDC1.

During the time period TDC1 between the time point t1 and the time point t2, the level of the DC output voltage VBUS is regulated to the pre-determined level VDC1, and the level of the DC output current ICHG is determined by the characteristic of the battery 21 and the voltage level VDC1 of the DC output voltage VBUS. The DC output current ICHG increases from IDC1 to IDC2 during the time period TDC1.

During the time period IDC2 between the time point t2 and the time point t3, the level of the DC output current ICHG increases from IDC2 to INC2, and the level of the DC output voltage VBUS increases from VDC1 to a pre-determined level VNC2.

After the time point t3, the charging system 3 is in the normal charging mode, wherein the DC output voltage VBUS is at a pre-determined level VNC2, and the level INC2 of the DC output current ICHG is determined by the charging circuit and the battery 21 of the mobile unit 20.

The profiles of the aforementioned embodiments are achieved by the following operations: the power receiver control circuit 23 transmitting the power delivery configuration to the power delivery control circuit 32 (the power delivery configuration for example may be generated by the power receiver control circuit 23 according to an electrical characteristic of the battery 21); and the power delivery control circuit 32 generating the power control signal PCS according to the power delivery configuration, to regulate the DC output power such that the DC output voltage VBUS and the DC output current ICHG correspond to the power delivery configuration, thus achieving the profiles. Note that in these embodiments, during the direct charging mode period between the time point t0 and the time point t3, the power delivery control circuit 32 can by itself regulate the DC output power corresponding to the power delivery configuration, and does not need to communicate with the power receiver control circuit 23. Since the power delivery unit 30 and the mobile unit 20 do not need to communicate with each other during the execution time period, the data transmission loading, such as data amount, number of communication times, and frequency of communication between the communication interfaces CIA and CIB is reduced, so that the overall operation performance of the mobile unit 20 can be improved.

The aforementioned power delivery configuration may include for example but not limited to VNC1, VNC2, VDC1 and VDC2 (corresponding to the aforementioned target output voltage), INC1, INC2, IDC1, and IDC2 (corresponding to the aforementioned target output current), TDC0, TDC1, and IDC2 (corresponding to the aforementioned execution time period) in the embodiments as shown in FIGS. 4 and 5. In addition to directly defining the target output voltage and/or the target output current and the execution time period, it is also doable to indirectly define the target output voltage and/or target output current and the execution time period. For example (but not for limiting), the power delivery configuration can define a target voltage-time changing rate (such as a voltage difference between two time points divided by the time period between these two time points) and/or a target current-time changing rate (such as a current difference between two time points divided by the time period between these two time points). For example, in the embodiment shown in FIG. 4, it is doable to define the target current-time changing rate during the execution time period TDC0, or the target voltage-time changing rate during the execution time period TDC2. And the execution time period may be defined by an absolute definition or a conditional definition. For example in the embodiment shown in FIG. 4, the execution time period TDC0 may be determined by counting a given time period (absolute time period) starting from the time point to, or may be determined by the DC output current ICHG achieving a pre-determined condition (conditional time period) starting from the time point t0, for example achieving the target output current IDC1. As another example, in the embodiment shown in FIG. 4, the execution time period TDC2 may be determined by counting a given time period (absolute time period) starting from the time point t2, or may be determined by the DC output voltage VBUS achieving a pre-determined condition (conditional time period) starting from the time point t2, for example achieving the pre-determined level VNC2.

In one embodiment, the power delivery configuration may further include a voltage limit of the DC output voltage VBUS and/or a current limit of the DC output current ICHG and/or a corresponding output limit time period. And the power deliver control circuit 32 can by itself adjust the voltage limit and/or current limit and control the DC output power to limit the DC output voltage VBUS and/or the DC output current ICHG to be not larger than the corresponding voltage limit and/or the current limit during the output limit time period, according to the power delivery configuration. For example, referring to FIG. 4, in this embodiment, the DC output voltage VBUS includes voltage limits VLMDC1, VLMNC1 and VLMNC2 during the time period TDC1, before the time point t0, and after the time point t3 respectively, and the DC output current ICHG includes current limits ILMDC1, ILMNC1 and ILMNC2 during the time period TDC1, before the time point t0, and after the time point t3, respectively. In accordance with the power delivery configuration, the power delivery control circuit 32 can by itself adjust the voltage limit and/or current limit and control the DC output power to limit the DC output voltage VBUS and/or the DC output current ICHG to be not larger than the corresponding voltage limit and/or current limit during the corresponding output limit time periods (for example but not limited to time periods TNC0, TNC3, and TDC0), and does not need to communicate the power receiver control circuit 23. Therefore, the data transmission loading, such as data amount, number of communication times, and frequency of communication between the communication interfaces CIA and CIB is reduced, so that the overall operation performance of the mobile unit 20 can be improved.

In one embodiment, the power receiver control circuit (for example but not limited to the power receiver control circuit 23 shown in FIG. 3) may request the power delivery control circuit (for example but not limited to the power delivery control circuit 32 shown in FIG. 3) to provide information in order for the power receiver control circuit to make a better judgment. The requested information may include: the power delivery configuration stored in the power delivery unit, and/or a power delivery present status of the power delivery unit, and/or a power delivery capability configuration of the power delivery unit. The power delivery configuration stored in the power delivery unit may be for example but not limited to a power delivery configuration received earlier from the power receiver control circuit. The power delivery configuration received earlier from the power receiver control circuit for example may be stored in a storage unit (not shown) of the power delivery unit or in a storage unit (not shown) of the power delivery control circuit. The power delivery present status may report the present status of the DC output power, for example including: at least one present output voltage status, and/or at least one present output current status, and/or at least one present voltage-time changing rate, and/or at least one present current-time changing rate. The power delivery capability configuration may report the operation capability of the power delivery unit, for example including: at least one output voltage range, and/or at least one output current range, and/or at least one voltage-time changing rate range, and/or at least one current-time changing rate range.

Figure 6A:
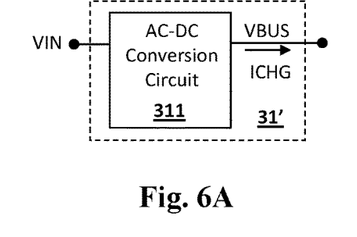
FIGS. 6A-6B show schematic diagrams of embodiments of the power conversion circuit of the charging system according to the present invention.
Figure 6B:
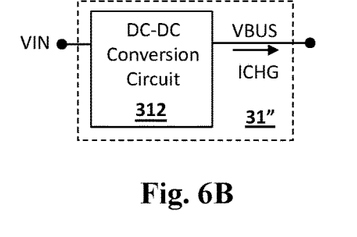

In one embodiment, the input power VIN of the charging system (for example but not limited to the charging system 3) of the present invention may be an AC power. Referring to FIG. 6A, under this circumstance, the power conversion circuit 31' (corresponding to for example but not limited to the power conversion circuit 31 shown in FIG. 3) may include an AC-DC conversion circuit 311 for converting the input power VIN to the DC output power. In another embodiment, the input power VIN may be a DC power. Referring to FIG. 6B, under this circumstance, the power conversion circuit 31" (corresponding to for example but not limited to the power conversion circuit 31 shown in FIG. 3) may include an DC-DC conversion circuit 312 for converting the input power VIN to the DC output power.

Figure 7:
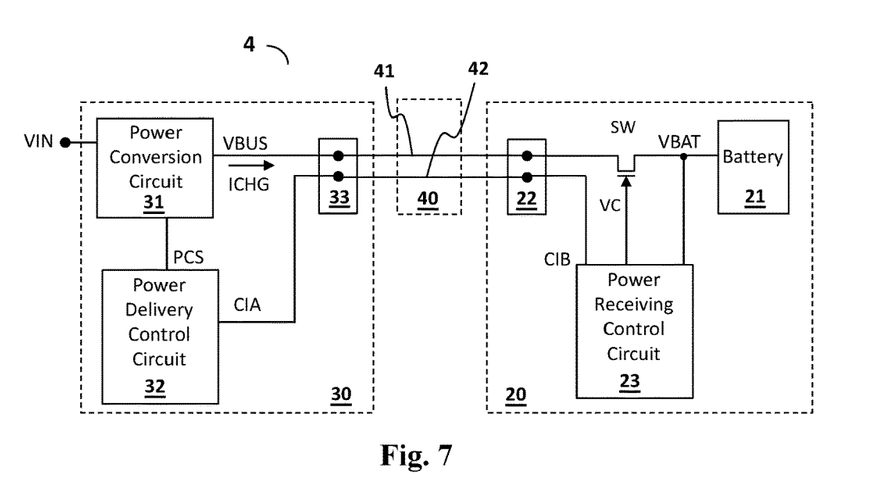
FIG. 7 shows a schematic diagram of an embodiment of the charging system according to the present invention.

In one embodiment, the power deliver unit (for example but not limited to the power delivery unit 30 shown in FIG. 3) may further include a connector 33. Referring to FIG. 7, in this embodiment, the connector 33 is for connecting the power delivery unit 30 to the cable 40, wherein the communication interface CIA is connected to the signal line 42 via the connector 33, and the DC output power is connected to the power line 41 via the connector 33.

Figure 8:
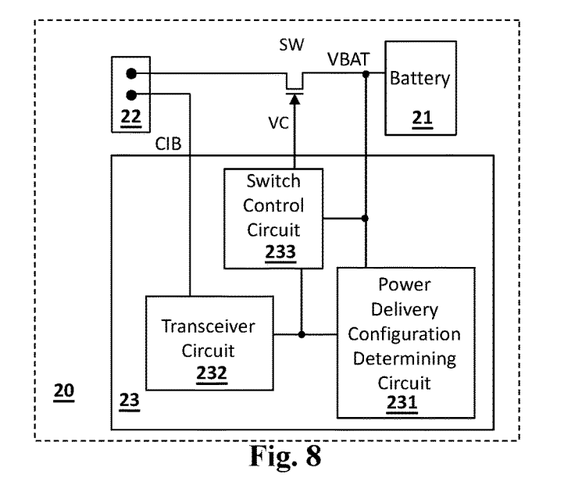
FIG. 8 shows a schematic diagram of an embodiment of the power receiver control circuit of the charging system according to the present invention.

Referring to FIG. 8, in one embodiment, the power receiver control circuit (for example but not limited to the power receiver control circuit 23 shown in FIG. 3) includes a transceiver circuit 232 and a power delivery configuration determining circuit 231, wherein the transceiver circuit 232 is for use in for example but not limited to a physical layer of the communication interface CIB to communicate with the communication interface CIA. The power delivery configuration determining circuit 231 is configured to operably determine the power delivery configuration according to at least one electrical characteristic of the battery 21, and/or a pre-determined program.

The transceiver circuit 232 transmits the power delivery configuration to the power delivery unit (for example but not limited to the power delivery unit 30 shown in FIG. 3), and when necessary, sends a request to the power delivery control circuit (for example but not limited to the power delivery control circuit 32 shown in FIG. 3), asking to provide information such as the aforementioned "power delivery configuration stored in the power delivery unit, and/or a power delivery present status of the power delivery unit, and/or a power delivery capability configuration of the power delivery unit", and receives the requested information transmitted from the power delivery control circuit. In one embodiment, the power delivery configuration determining circuit 231 may further optionally (but not necessarily) determine the power delivery configuration according to the information above. In one embodiment, the power receiver control circuit 23 includes a switch control circuit 233 for generating a power control signal VC according to at least one electrical characteristic of the battery 21 or a command generated by the power delivery configuration determining circuit 231, to control the switch SW such that the charging system can enter or does not enter the direct charging mode.

Note that the power receiver control circuit is not necessarily a part internal to the mobile unit 20. For example, a part of the power receiver control circuit may be external to the mobile unit 20.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, other than a single target output current, the "direct charging mode" may include plural target output currents for multiple-step constant current charging. As another example, the "constant current mode" and the "constant voltage mode" may be employed together and the charging system can switch between different modes during one or plural periods. The charging system can set the power delivery configurations correspondingly. Furthermore, those skilled in this art can readily conceive variations and modifications within the spirit of the present invention. For example, the power delivery configuration is not limited to including all the execution time periods in the embodiments shown in FIGS. 4 and 5, but may include partial of the execution time periods as above. And, an execution time period may be defined as one including the plural execution time periods in the embodiments shown in FIGS. 4 and 5 (for example the combination of TDC0, TDC1 and TDC2 may be considered as one execution time period). As another example, the power delivery configuration may also be applied in the normal charging mode. Under this circumstance, though the power delivery unit does not directly charge the battery, yet the power delivery unit can by itself generate an output voltage or current or control a change rate thereof during one or plural time periods, according to a power delivery configuration expressing the requirements from the circuit to be charged. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charging control method, for controlling a power delivery unit to provide an output power for a mobile unit, wherein the output power includes a DC output voltage and/or a DC output current, the method comprises:

receiving a power delivery configuration by the power delivery unit, wherein the power delivery configuration defines at least one execution time period and plural voltages and/or currents;

the power delivery unit operating according to the power delivery configuration to regulate the DC output voltage and/or the DC output current during the at least one execution time period such that the DC output voltage and/or the DC output current correspond to the power delivery configuration.

2. The charging control method of claim 1, wherein the power delivery configuration defines:
(1) plural target output voltages, or plural target output currents, or a combination of a target output voltage and a target output current, or at least one target relationship of the output voltage relative to time, or at least one target relationship of the output current relative to time, or a combination of two or more of the above; and
(2) the at least one execution time period.

3. The charging control method of claim 2, wherein the at least one execution time period is an absolute time period or a conditional time period.

4. The charging control method of claim 2, wherein the power delivery configuration further defines:
at least one voltage limit, and/or at least one current limit, and/or at least one output limit time period.

5. The charging control method of claim 1, further including: transmitting the following information from the power delivery unit to the mobile unit: the power delivery configuration stored in the power delivery unit, and/or a power delivery present status of the power delivery unit, and/or a power delivery capability configuration of the power delivery unit;
wherein the power delivery present status includes at least one present output voltage status, and/or at least one present output current status, and/or at least one present voltage-time changing rate, and/or at least one present current-time changing rate; and
wherein the power delivery capability configuration includes at least one output voltage range, and/or at least one output current range, and/or at least one voltage-time changing rate range, and/or at least one current-time changing rate range.

6. The charging control method of claim 5, wherein the mobile unit includes a battery, and the power delivery configuration is determined according to at least one electrical characteristic of the battery, and/or a pre-determined program, and/or the information which is transmitted from the power delivery unit to the mobile unit.

7. The charging control method of claim 1, wherein the mobile unit includes a battery, and the power delivery configuration is determined according to at least one electrical characteristic of the battery, and/or a pre-determined program.

8. The charging control method of claim 1, wherein the power delivery unit and the mobile unit do not communicate with each other during the at least one execution time period.

9. The power delivery unit which is controlled by the charging control method of claim 1.

10. A charging system, including:
the power delivery unit which is controlled by the charging control method of claim 1;
the mobile unit which receives the output power provided by the power delivery unit; and
a cable, configured to operably connect the power delivery unit and the mobile unit.

11. The charging system of claim 10, wherein the cable complies with the USB PD (Universal Serial Bus Power Delivery) specification, and includes a power line and a signal line.

12. A power receiver control circuit, configured to operably control a power delivery unit to provide an output power for a battery of a mobile unit, wherein the output power includes a DC output voltage and/or a DC output current, the power receiver control circuit includes:
a power delivery configuration determining circuit, configured to operably determine a power delivery configuration according to at least one electrical characteristic of the battery and/or a pre-determined program, wherein the power delivery configuration defines at least one execution time period and plural voltages and/or currents; and
a first communication interface, configured to operably communicate with a second communication interface of the power delivery unit to transmit the power delivery configuration to the power delivery unit.

13. The power receiver control circuit of claim 12, wherein during the at least one execution time period, the power delivery unit and the power receiver control circuit do not communicate with each other and the power delivery unit generates the DC output power according to the power delivery configuration, whereby data transmission loading is reduced between the first communication interface and the second communication interface during the at least one execution time period.

14. The power receiver control circuit of claim 12, further including a switch control circuit which controls a switch connected between the power delivery unit and the battery according to at least one electrical characteristic of the battery and/or a command generated by the power delivery configuration determining circuit.

15. The power receiver control circuit of claim 12, wherein the power delivery configuration defines:
(1) plural target output voltages, or plural target output currents, or a combination of a target output voltage and a target output current, or at least one target relationship of the output voltage relative to time, or at least one target relationship of the output current relative to time, or a combination of two or more of the above; and
(2) the at least one execution time period.

16. The power receiver control circuit of claim 15, wherein the at least one execution time period is an absolute time period or a conditional time period.

17. The power receiver control circuit of claim 16, wherein the power delivery configuration further defines:
at least one voltage limit, and/or at least one current limit, and/or at least one output limit time period.

18. The power receiver control circuit of claim 12, wherein the power receiver control circuit requests the following information from the power delivery unit: the power delivery configuration stored in the power delivery unit, and/or a power delivery present status of the power delivery unit, and/or a power delivery capability configuration of the power delivery unit;
wherein the power delivery present status includes at least one present output voltage status, and/or at least one present output current status, and/or at least one present voltage-time changing rate, and/or at least one present current-time changing rate; and
wherein the power delivery capability configuration includes at least one output voltage range, and/or at least one output current range, and/or at least one voltage-time changing rate range, and/or at least one current-time changing rate range.

19. The power receiver control circuit of claim 18, wherein the power delivery configuration determining circuit further determines the power delivery configuration further according to the information requested by the power delivery configuration determining circuit.

\* \* \* \* \*